July 11, 1939.  E. A. MUMMÉ  2,165,673
SAUSAGE-LINKING MACHINE
Filed May 22, 1937  4 Sheets-Sheet 1
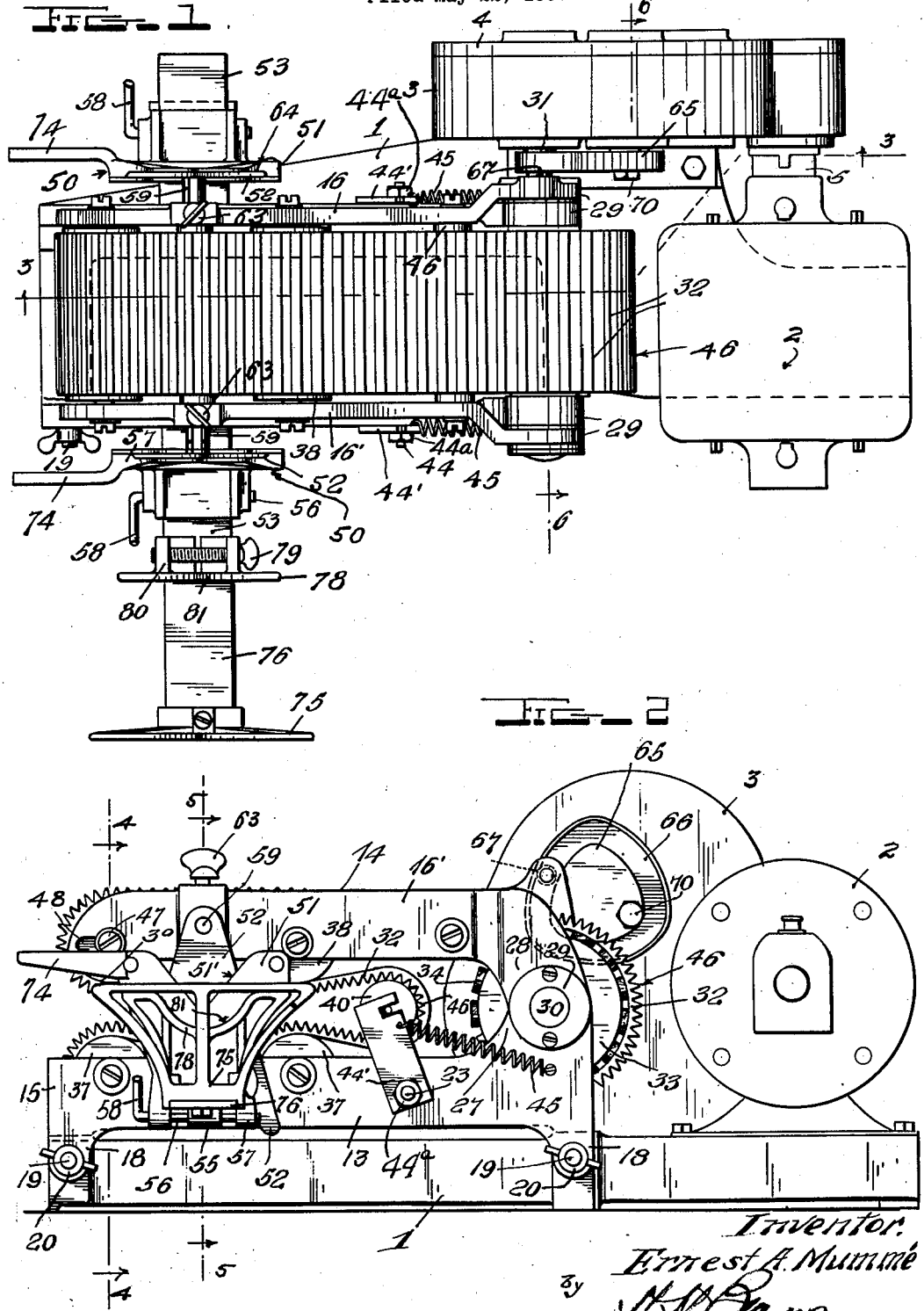
Inventor.
Ernest A. Mummé
by
Attorney

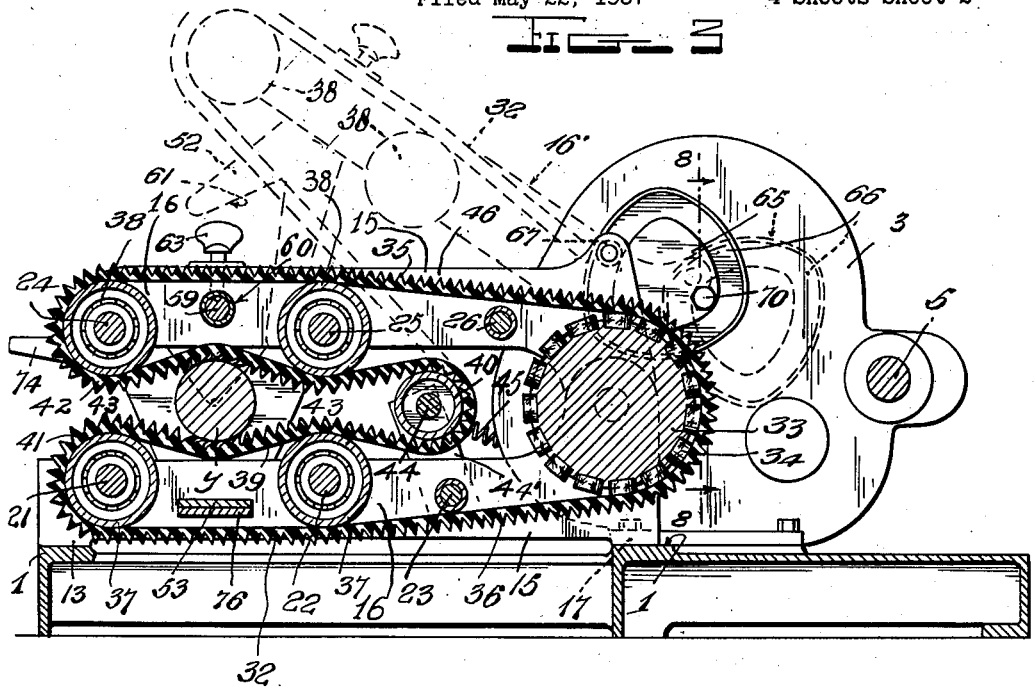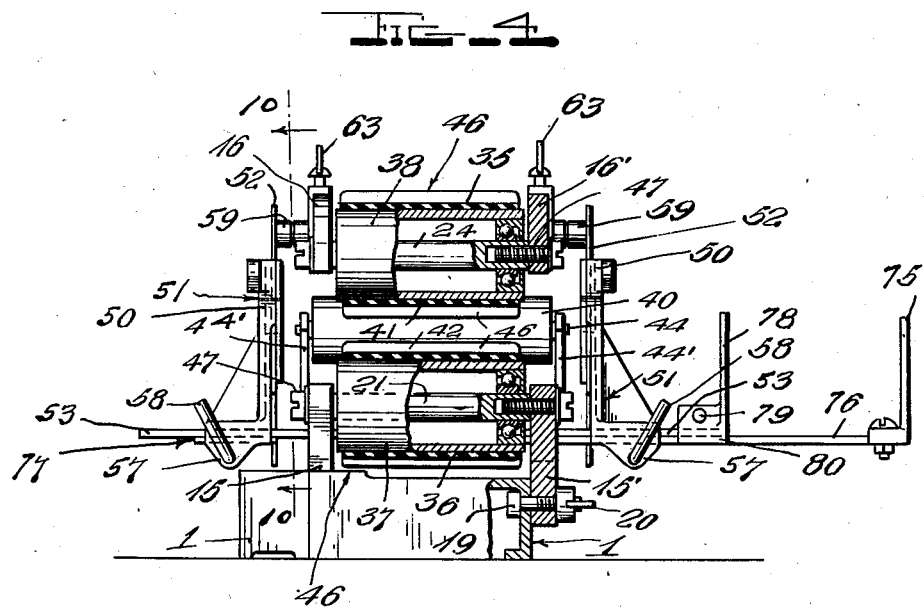

July 11, 1939. E. A. MUMMÉ 2,165,673
SAUSAGE-LINKING MACHINE
Filed May 22, 1937 4 Sheets-Sheet 3
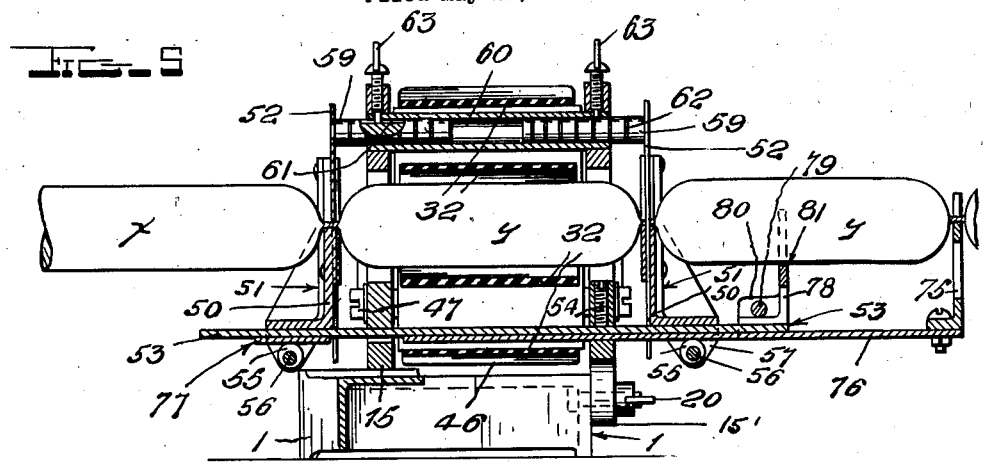
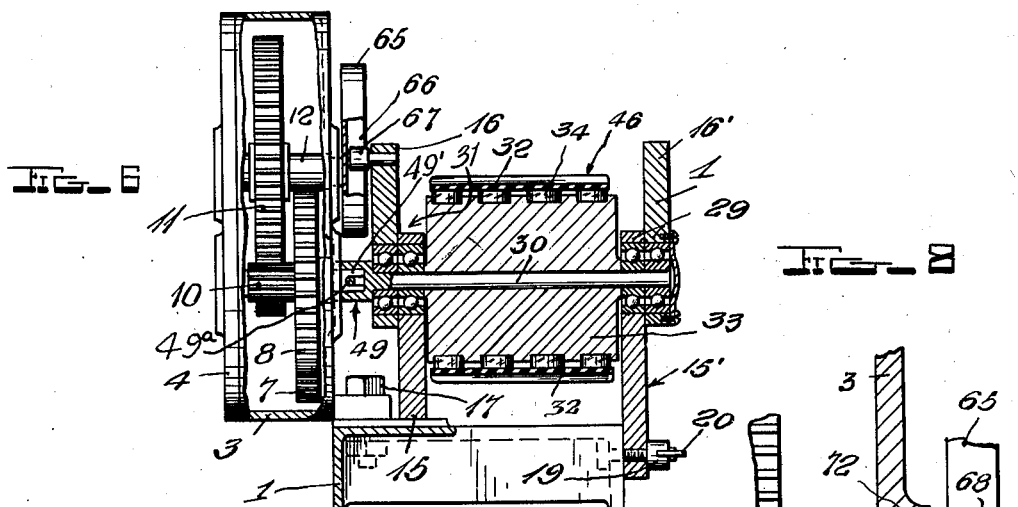
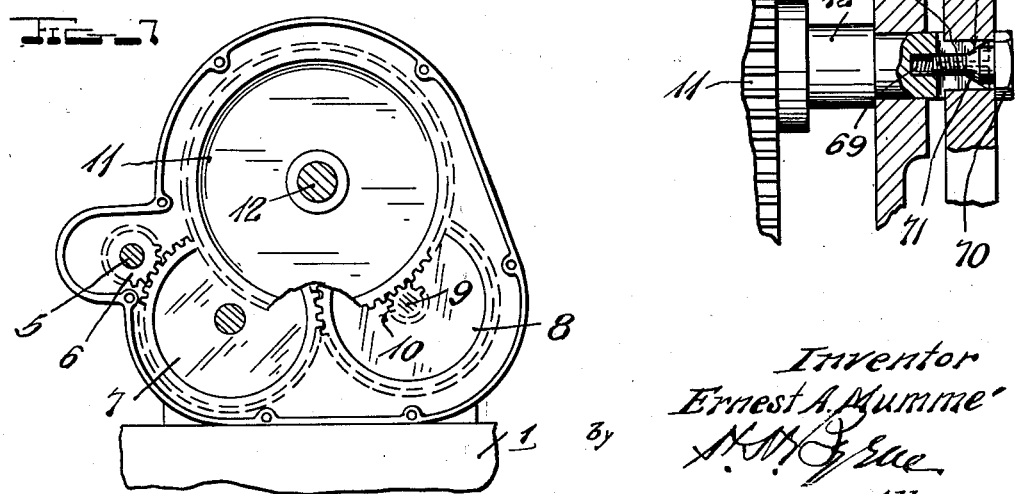
Inventor
Ernest A. Mummé
Attorney July 11, 1939.　　　　　E. A. MUMMÉ　　　　　2,165,673
SAUSAGE-LINKING MACHINE
Filed May 22, 1937　　　　4 Sheets-Sheet 4
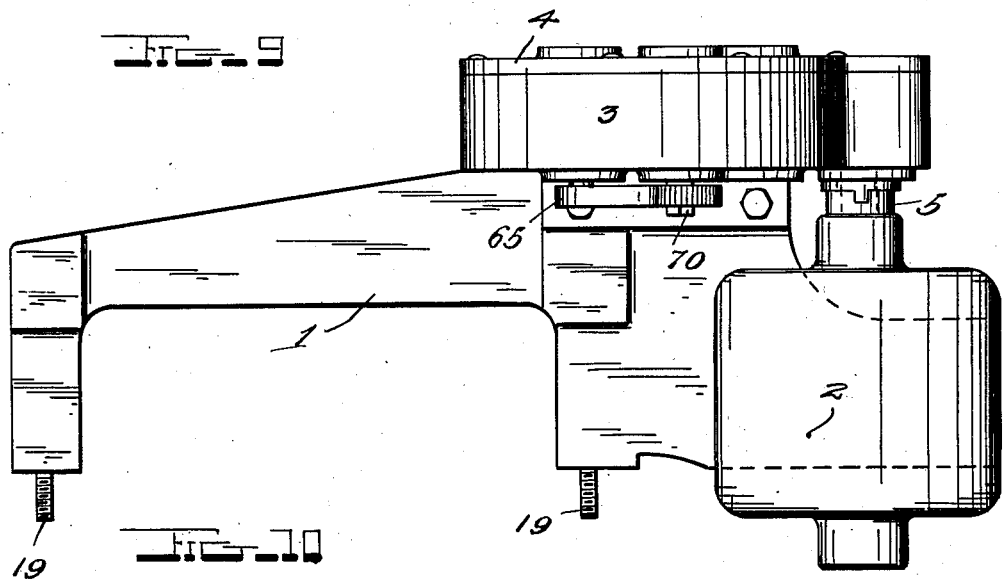
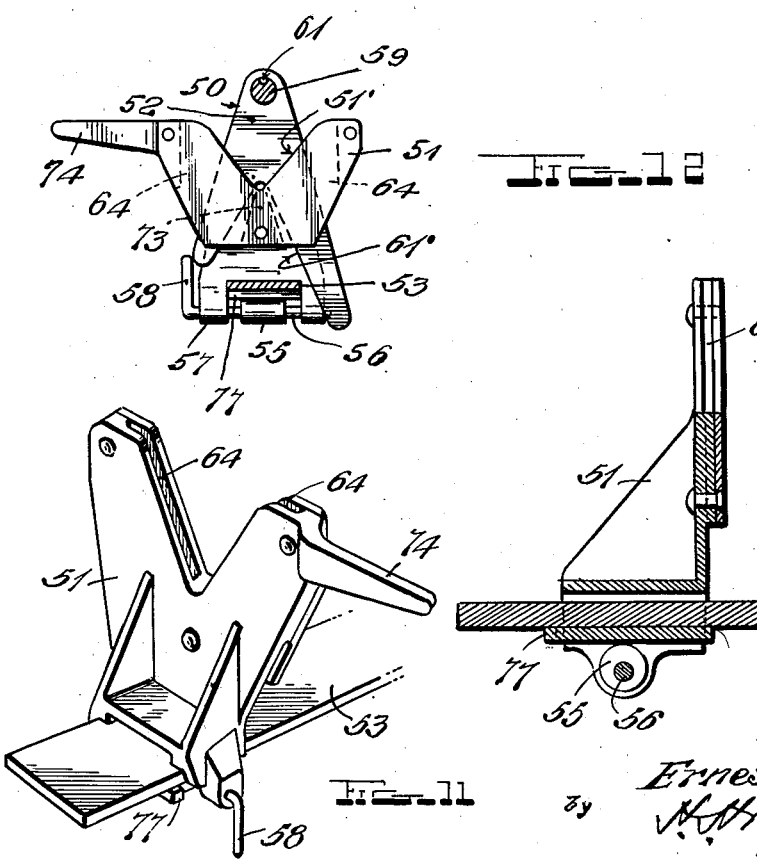
Inventor
Ernest A. Mummé
by
Attorney Patented July 11, 1939

2,165,673

UNITED STATES PATENT OFFICE 2,165,673

SAUSAGE-LINKING MACHINE

Ernest A. Mummé, Minneapolis, Minn.

Application May 22, 1937, Serial No. 144,258

12 Claims. (Cl. 17—34)

This invention relates to improvements in machines for forming filled sausage casings into sausage links.

One object of my invention is to provide a machine of this character by means of which a filled sausage casing may be easily, conveniently and quickly formed into links without injury to the delicate sausage casing.

Another obect of my invention is to provide a sausage linking machine embodying means for diametrically contracting the casing at longitudinally spaced points and rotating the intervening portion of the casing about its axis so as to form twists in the casing at the contracted points, whereby, through successive operations of this character, links may be formed in a sausage casing of any desired length.

Still another object of my invention is to provide a sausage linking machine which ensures the positive and certain contraction and gripping of the casing before it is twisted, and the twisting of the casing between the contracted and gripped portions in a positive but delicate manner, so as to prevent injury to the casing either at the points at which it is gripped or at the points where it is engaged for the twisting action.

Still another object of my invention is to provide novel gaging and contracting and gripping means whereby the casing may be accurately positioned, contracted and gripped for successive linking actions, and whereby the gaging means may be reversed as to position to allow either right or left hand feeding of the sausage casing, as may be found most convenient or as circumstances may require.

With these and other objects in view, which will appear in the course of the subjoined description, the invention consists of the features of construction, combination and arrangement of parts, hereinafter fully described and claimed, reference being had to the accompanying drawings, showing a preferred form of embodiment of the invention, in which:

Fig. 1 is a top plan view of a sausage linking machine embodying my invention.

Fig. 2 is a side elevation of the same.

Fig. 3 is a view partly in side elevation and partly in central longitudinal section taken on the irregular line 3—3 of Fig. 1, showing movements of certain parts by dotted lines.

Fig. 4 is a view partly in front elevation and partly in vertical transverse section taken on the line 4—4 of Fig. 2.

Fig. 5 is a transverse section taken on the line 5—5 of Fig. 2.

Fig. 6 is a transverse section taken on the line 6—6 of Fig. 1.

Fig. 7 is an outer side view of the gear case with its cover plate removed and also fragmentarily illustrating the machine base.

Fig. 8 is a detail section on an enlarged scale taken substantially on the line 8—8 of Fig. 3.

Fig. 9 is a top plan view of the base, motor and gear case of the machine.

Fig. 10 is a sectional elevation taken on the line 10—10 of Fig. 4.

Fig. 11 is a perspective view of one of the lower pincer members.

Fig. 12 is a cross-sectional view thereof.

In carrying my invention into practice I provide a sausage linking machine having opposed surfaces forming a throat to receive a portion of the casing to be twisted. These surfaces are relatively movable toward and from each other to open and close the throat at timed periods, and constitute engaging elements movable in opposite directions and at an angle to the direction of their opening and closing movements to impart twisting rotation to the portion of the casing engaged thereby. These elements are of such form and material as to firmly but delicately engage the sausage casing and so as to act thereon without injury thereto. At opposite sides of this throat are positioned casing contracting and gripping elements which are opened and closed in coordination with the twisting elements in such manner as to hold the portions of the casing which are to be twisted firmly gripped during the twisting action, thereby ensuring the production of close twists and preventing slippage and abrasion of or other injury to the casing portions being twisted. A gage is provided for properly gaging the position of the casing as fed up for a link forming operation and for supporting a formed link portion while a succeeding casing portion is being formed into a link. This gage is reversible as to position to enable a right hand or left hand feed of the filled casing to be carried out as may be required or found most desirable. The twisting elements are preferably formed by portions of the runs of a looped belt designed to bear delicately but with sufficient force on the casing to effect the twisting action without distorting, tearing or otherwise injuring the casing. Mechanism of simple character is provided for operating the contracting and gripping and the twisting elements simultaneously and at proper time periods to allow shifting of the casing between successive link forming operations. The drawings show an exemplificative form of mechanism embodying these features for carrying the invention into practical effect, without, however, intending to limit the invention to the particular constructions and combinations of parts which, for purpose of exemplification, I have set forth.

In the practical embodiment of my invention as herein disclosed, I provide a base 1, preferably of cast metal, of suitable size and shape for supporting the working parts of the machine. At the rear end of this supporting base is mounted an electric motor 2, and a gear casing 3 is also mounted upon the rear end of the base at one side thereof and in transverse alinement with the motor. This gear case is provided at its outer side with a detachable cover plate 4, removal of which allows access to the gear elements therein. The shaft 5 of the motor 2 extends into the gear case and carries, as shown in Figs. 6 and 7, a gear pinion 6 meshing with a transmission gear 7 which in turn meshes with a second transmission gear 8 on a drive shaft 9 carrying a pinion 10 meshing with a gear 11 on a second drive shaft 12, whereby said shafts 9 and 12 are continuously driven in the operation of the motor. These shafts are employed for driving the sausage link forming elements of the machine, which I will now proceed to describe.

Mounted upon the forward portion of the base 1 are lower and upper frames 13 and 14, the lower frame comprising a pair of laterally spaced horizontal frame bars or side members 15 and 15' and the upper frame comprising a pair of laterally spaced frame bars or side members 16 and 16'. The lower frame member 15 preferably rests directly upon the upper surface of the base 1 and is fixed in position thereon by bolts or other fastenings 17, while the frame member 15' is preferably provided at its front and rear end with lugs or extensions 18 which project downwardly at the adjacent side of the base and are detachably secured thereto by bolts 19 and wing nuts 20, the frame member 15' thus being mounted for ready removal so as to allow of the convenient removal therewith at one side of the machine of the parts comprising the link forming mechanism for cleaning, repairs, replacements and other like purposes.

The frame members 15 and 15' are connected and held in spaced relationship by cross tie rods 21, 22 and 23, detachably connected at their ends thereto in any preferred manner, while the frame members 16 and 16' are similarly connected and held in spaced relationship by cross tie rods 24, 25 and 26. The frame members of the lower and upper frames are provided at their rear ends with upwardly and downwardly projecting extensions 27 and 28, respectively, which are apertured to receive anti-friction bearings 29 whereby they are hingedly connected. These bearings 29 have journaled therein the ends of a shaft 30 one end of which is connected to an end of the shaft 9 projecting outwardly from the gear casing, said ends of the shaft being united by a separable coupling 31 forming a driving connection between them, while admitting of their ready connection and disconnection when occasion requires.

The upper frame 14 is thus mounted at its rear end for upward and downward movements toward and from the relatively fixed frame 13, and these frames cooperate to form relatively movable jaws for supporting and relatively adjusting or positioning the complemental parts of devices for action on the filled sausage casing X for the formation of successive links Y therein. The means provided for this purpose comprises an endless flexible belt 32 of suitable material, such as rubber or equivalent flexible material, the bight portion of which at its rear end passes around a driving drum or pulley 33 mounted on the shaft 30, which pulley is preferably provided with a friction face formed of a multiplicity of projecting friction pieces 34, such as cork for example, fixed in pockets in the periphery of said pulley, whereby an effective frictional driving engagement between the pulley and the belt is furnished. The belt thence extends forward in the form of upper and lower runs or stretches 35 and 36 which travel over the under and upper surfaces of sets of supporting and guiding pulleys 37 and 38 respectively mounted on the lower and upper sets of cross tie members 21, 22, 24 and 25. After passing around the forward pulleys 37 and 38 the belt is extended rearwardly in the form of a loop 39 between the runs 35 and 36, the bight portion of which passes around a guide and tension pulley 40. The lower and upper runs 41 and 42 of this loop travel in contact with the upper and lower surfaces of the pulleys 37 and 38 respectively. By this construction it will be seen that the belt is doubled upon itself to provide an outer loop and an inner loop, the runs 41 and 42 of which inner loop are arranged in superposed relation to form between the front and rear sets of pulleys 37 and 38 a throat 43 to receive the portion of the filled casing X which is to be rotated for a link forming action. The pulley 40 is rotatably mounted upon a rod or stationary shaft 44 carried by bearing bars 44' pivotally mounted at their lower ends to swing forwardly and rearwardly upon the ends of the cross tie rod 23 to maintain the belt runs 41 and 42 and the belt as a whole under a desired state of tension, said ends of the cross tie rod being fitted with retaining nuts 44a to hold the bearing bars from displacement, and the upper ends of said bars 44' being connected to the lower frame members by tensioning springs 45 normally serving to swing the bars 44' rearwardly and to yieldingly oppose forward movement thereof. The outer surface of the belt is fluted or provided with transverse ribs, fins or gripping teeth 46 which are adapted to engage and exert a delicate driving action on the surface of the sausage casing to rotate the casing without abrasion or other injury thereto. In the operation of the belt the runs 41 and 42, which form surfaces to engage and rotate the casing for a twisting action, run in contact with opposite sides of the casing and move in opposite directions to impart rotation thereto.

The cross tie rods or shafts 21, 22, 24 and 25 are secured to the frame bars 15, 15', 16, 16' by screws 47 and the screws 47 which secure the cross tie rod or shaft 24 to the frame bars 16, 16' are fitted in slots 48 in said frame bars for adjusting the roll 38 to slacken the belt as required or to take up undue slack therein. The coupling connection 31 between the shafts 9 and 30 comprises, as particularly shown in Fig. 6, a socket 49 on the end of the shaft 30 receiving the outer end 49' of the shaft 9 which is bifurcated or forked, and said socket on the shaft 30 is provided with a cross pin 49a engaging the slot in the end of the shaft 9, thus forming the coupling connection, generally designated 31, which is connectable and disconnectable by endwise movement of the shaft 30 laterally of the machine, as will be readily understood.

As stated, the opposed portions of the runs 41 and 42 of the inner belt loop lying between the vertically alined sets of pulleys 37 and 38 on rods 21, 22, 24 and 25, form a throat 43 to receive the filled sausage casing X, which is fed up longitudinally from one side of the machine toward the opposite side thereof to successively present portions of the filled casing for the action thereon of the belt and coacting casing contracting and gripping devices, whereby the links are successively formed. To form the casing X into links Y there are provided for cooperation with the belt 32 pairs of contracting and gripping devices or pincers 50, located one pair on each side of the throat 43. Each pair of pincers comprises a fixed lower member 51 and a movable upper member 52. The lower pincer members 51 are mounted for sliding adjustment on a slide bar 53 extending transversely of the lower belt frame and through openings in the frame members 15, 15', the adjustable engagement between the pincer members 51 and the slide bar 53 permitting the pairs of pincer members to be adjusted relatively to each other to suit the link which is to be formed in the sausage casing. The slidable engagement of the bar 53 with the openings in the frame bar 15, 15' also permits of the adjustment of this bar to regulate its working position. The slide bar 53 when adjusted is held against movement by a set screw 54 carried by one of the lower frame bars. Each lower pincer member 51 is adapted to be secured in adjusted position to the slide bar 53 by locking cams 55 on rock shafts 56 journaled in depending bearing lugs 57 on said pincer members, each shaft 56 having a crank handle 58 by which it may be rocked to set or release its cam 55. Between the slide bar 53 and the right cam 55, and between the slide bar 53 and the left cam 55, there are interposed, respectively, a slide bar 76 and a spacer 77, which, when the cams 55 are locked, are clamped between the slide 53 and the corresponding cams. The purpose of the slide bar 76 and spacer 77 will be referred to below. The lugs 57 of each pincer member 51 closely engage the longitudinal edges of the slide bar 53 to hold the pincer member against lateral play and to guide the same accurately in its sliding movements on the slide bar.

The upper pincer members 52 are fixed at their upper ends to the outer ends of guide pins or rods 59 slidably mounted in the opposite ends of a tubular guide 60 fitted in the frame bars 16, 16'. The pins or rods 59 are movable in the tube 60 to permit adjustments of the upper pincer members with the lower pincer members and form supports to stably hold the upper pincer members in working position. The pins 59 are each provided with a longitudinal guide groove 61 and with a series of longitudinally spaced annular locking grooves 62 for the reception of reduced locking and guiding pins on the lower ends of guiding and locking screws 63 mounted on the frame bars 16, 16', whereby the pins 61 are adapted to be accurately guided in their longitudinal sliding movements and to be held in adjusted position and against rotation in the guide tube 60. It will thus be understood that the upper and lower pincer members of each pair of pincers are adapted to be simultaneously adjusted relatively to each other to set the pincers different distances apart for the formation of links of different lengths in a sausage casing. The upper pincer members 52 are movable upwardly and downwardly in guide grooves or slots 64 in the lower pincer members for opening and closing the pincers. The opposed portions of the pincer members are provided with V-shaped slots or openings forming between them sausage casing receiving spaces which are contractible by downward movement of the upper pincer members so that the sausage casing may be contracted and gripped between the pincer members. The prongs at the lower end of each upper pincer member 52 constituting the walls of the V-shaped slot therein are slidable in the guide slots or openings 64, and the rear prong of each member 52 is made longer than the front prong thereof. These longer prongs of the upper pincer members ensure their engagement with their guide slots 64 in the lower pincer members in any open position of the pincers, thus preventing complete disconnection of the upper pincer members from the lower pincer members and ensuring a correct guiding engagement between them at all times.

The upper frame or jaw 14 is adapted to be swung upwardly, simultaneously lifting the run 42 of the twisting belt and the upper pincer members 52 of the pincers to open the twisting throat and the pincers sufficiently to admit of a feed-up motion of the sausage casing X into the pincers and between the runs 41 and 42 of the twisting throat. Downward movement of the frame or jaw 14 brings the belt run 42 into working position to engage the upper surface of the portion of the sausage casing lying between it and the belt run 41 and to hold the sausage casing gripped between said belt runs. This downward movement of the frame or jaw 14 also moves the upper pincer members so that the portions of the sausage casing lying between the pincer members will be contracted and the contracted portions of the casing gripped between the pincer members sufficiently tight to ensure a twisting of the gripped portions when the intervening portion of the sausage casing is rotated. The formation of the casing receiving openings in the pincer members is such, however, that when the pincer members are fully closed the engaged portions of the casing will be securely retained but not gripped or held with sufficient tightness to cause injury thereto during the twisting action.

The sausage casing rotating the twisting belt 32 is continuously driven by the rotation of the pulley 33, but mechanism is provided for raising and lowering the upper jaw frame 14 so that the casing engaging portions of the belt and the pincers will be intermittently opened and closed, or opened and closed at proper time periods. This mechanism comprises a cam wheel 65 mounted on the shaft 12 and provided at one side with a suitably shaped cam groove 66 receiving a roller 67 on the rear end of the frame or jaw 14, the shape of the slot being such as to effect a complete up and down movement of the jaw 14 and link forming action on the sausage casing on each complete revolution of the cam wheel 65. The cam 65 is preferably detachably mounted on the shaft 12 so that it may be conveniently applied thereto and removed therefrom in assembling and disassembling the parts of the machine. As shown in the present instance, the end of the shaft 12 on which the cam is mounted is longitudinally split and provided with a conical seat 68 and a threaded recess 69, and the hub of the cam is provided with an opening receiving and engaging the split end of the shaft and also receiving a fastening screw 70 having a conical surface 71 to frictionally engage the seat 68 and a threaded stem portion 72 to engage the threaded socket 69 whereby the screw may be adjustably engaged and locked to the shaft and the cone 71 caused to spread or expand the split portion of the shaft into engagement with the walls of the hub of the cam. This mode of mounting the cam and the mode of mounting the frame bars 15', 16' in position on the base 1, adapt such parts and the working parts mounted on the frame members 15 and 16 to be quickly and conveniently assembled or disassembled for cleaning, repairs or replacement of parts from one side of the machine.

In the operation of the parts of the machine as thus far described, it will be understood that successive portions of the filled sausage casing are brought into link forming position by endwise movement of the sausage casing in one direction transversely of the machine, and that in each link forming operation, the portion of the sausage casing which is brought into working position is engaged by the gripping or twisting surfaces 41 and 42 of the belt loop and by the jaws of the pincers, which contract and hold the casing on opposite sides of the portion thereof engaged by the belt. Movement of the portions 41 and 42 of the belt in opposite directions will rotate the portion of the casing engaged thereby, while the portions thereof disposed in the grippers are being held or substantially held from rotation, whereby the portions held in the grippers will be twisted to close the contracted portions of the casing, whereby a sausage link is formed. At the end of this link forming operation the jaw 14 moves upwardly or opens, another portion of the sausage casing is fed up to form the succeeding link, and upon the closing of the jaw 14 the link forming operation above described will be repeated. In this manner a filled sausage casing of any length may be operated upon as it is fed up at proper time periods to form successive links in the casing, the operation, with the exception of that of splitting up the sausage casing, being entirely automatic in character. Owing to the fact that the portions of the sausage casing held in the grippers or pincers are not tightly held, but only held with sufficient firmness to ensure the formation of twists, the twist formations may be effected without abrasion or other injury to such portions of the casing. By the use of a flexible casing twisting or rotating belt of rubber, having soft, flexible flanges, fins or tooth-like projections to engage the casing, the operation of rotating the casing for the twisting action may also be effected without the slightest injury to the delicate sausage casing.

It is important to note in this connection that in the closing movement of the jaw 14 the upper pincer members 52 are positioned relative to the lower pincer members 51 so that the opposed contracted portions of the receiving slots or openings 51' and 61' in the pincer members will not be completely closed, but will leave therebetween spaces or openings of sufficient size to retain the contracted portions of the casing without danger of being cut or otherwise damaged. To afford relatively long bearings for the casing X in the slots or notches in the pincer members the said slots or notches, at the bottoms thereof, are broken by filler blocks 73, which obviate any liability of the sausage casing being cut or pinched. On the upper ends of the front prongs of the lower pincer members 51 are forwardly projecting fingers 74 which afford supports from the casing X when placing the same in the throat 43 by lateral movement. Obviously, only every other link Y is formed by the belt surfaces 41 and 42 and the pincers, and for this reason the gage 75 is provided by which the casing X may be supported for a distance equal to the length of two links and so positioned that one link Y will be formed between the gage and the right hand pair of pincers while another link is being formed by the belt and the opposite pair of pincers. To thus position the casing X the same is moved endwise to bring the twisted portion thereof formed by the left hand pair of pincers 50 into engagement with the gage 75. This gage 75 is rigidly secured in an upstanding position on the outer end of the slide bar 76 which is referred to above, and extends under the slide 53 and through the aperture in the frame member 15' and is adapted to be rigidly clamped against the underside of said slide 53 by the right hand cam 55.

The spacer 77 referred to above is interposed between the slide 53 and the left hand cam 55. The gage 75 as shown in the drawings is set for feeding the casing X from left to right in a link forming operation, but it is evident that by interchanging the slide 76 and spacer 77 the gage 75 may be reversed as to position for feeding said casing from right to left for a link forming operation. The cams 55 perform a double function, i. e., they hold the lower pincer members 51 where set on the slide 53 and they also hold the slide 76 where set on the slide 53.

A steady rest or support 78 is provided for the formed link Y between the right hand pair of pincers and the gage 75 and is mounted on the slide 53. The base of the rest 78 is notched to receive the slide 53 and also vertically split at its transverse center to permit contraction of said base onto the longitudinal edges of the slide 53. A thumb-screw 79, mounted in a pair of laterally spaced lugs 80 on the base of the rest 78, is provided for contracting said base and frictionally clamping the same onto the slide 53. In the upper edge of the rest 78 is a centering notch or seat recess 81 for the casing X.

*Operation*

It may be assumed that the upper frame or jaw 14 is being successively raised and lowered with a timed action by the cam wheel 65 and cooperating cam roller 67 to open and close the throat 43. A filled sausage casing to be formed into links is placed by the operator transversely in the throat 43, when open, and in the pairs of pincers 50 which center said casing as the jaw 14 closes the upper pair of pincer members 52 which, together with the pincer members 51, contract or gather the casing X and separate the filling therein.

During the final closing movement of the jaw 14 the lower and upper runs 41 and 42 of the belt 32 in the throat 43, which are moving in opposite directions, engage the casing X on opposite sides thereof and rotate the same about the contracted portions thereof and twist said contracted portions of the casing. During the twisting of the casing X, said casing is being held by the operator at or in the region of the outer sides of the two pairs of pincers 50. At the time the throat 43 is closed the fin-like corrugations 46 on the belt 32 engage said casing and fold thereon and gently engage the casing X with sufficient pressure to rotate the same without breaking or otherwise damaging said casing, which is highly essential for the successful operation of the machine.

By reference to Fig. 3, it will be noted that the link Y, being formed by the twisting belt 32, is centered between the four rolls 37 and 38 on rods 21, 22, 24, 25 so that said belt engages the casing X with equal pressure at the contacted sides thereof. When the throat 43 is open, at the completion of the forming of a link Y therein, the operator moves the casing X endwise and positions the twisted left hand end of the last formed link Y in the gage 75. It will thus be seen that it is only necessary to twist the casing X for every other link Y.

The pairs of pincers 50 and gage 75 may be very quickly adjusted for forming links of different lengths, or the gage 75 and rest 78 may be quickly shifted from one side of the machine to the other, so that the casing X may be fed either from the left or the right hand side thereof. The slack in the twisting belt 32 may be varied, at will, by adjusting the front upper roll 24 when forming casings of different diameters into links.

To clean the machine the nuts are removed from the screw bolts or studs 19 and the frame assembly moved bodily to the right to withdraw said studs from the lugs 18 and thereby disconnect the frame assembly from the base assembly. This movement of the frame assembly from the base assembly also separates the coupling 31 and withdraws the roller 67 from the groove in the cam wheel 65. With the frame assembly removed from the base assembly said base assembly may be very easily cleaned as all parts thereof are fully exposed. To clean the detached frame assembly the shaft 44 of roll 40 is removed from its open seats in the bearing bars 44' to release the roll 40 and permit the endwise removal thereof from the belt 32. The looped portion of the belt 32 is next removed from between the upper and lower pairs of rollers 37 and 38 on rods 21, 22, 24, 25, and to facilitate this procedure the jaw 14 may be raised. Next, the belt 32 is removed edgewise from the jaws 13 and 14. It is important to note that there are no parts of the frame assembly that will interfere with this removal of the belt 32. To further facilitate the cleaning of the frame assembly the pairs of pincers 50, slides 53 and 76 and spacer 77 may be very quickly and easily removed from the frame assembly. With the parts of the frame assembly thus disconnected, they may be thoroughly cleaned and sterilized before reassembling the machine.

It will be understood, as hereinbefore stated, that the invention described is capable of various modifications within the scope of the invention herein disclosed and set forth in the appended claims.

What I claim is:

1. In a machine for forming links in a filled sausage casing, the combination of a pair of relatively movable jaws forming a throat to receive a portion of a filled sausage casing, an endless flexible belt mounted for travel on the jaws and having outer runs and inner runs, the said inner runs being disposed to engage the portion of the casing received in the throat to rotate the same and being movable to casing engaging and releasing positions by closing and opening movements of the jaws, grippers for supporting the casing on opposite sides of the throat and contracting and holding the casing at spaced points to form twists in the casing at such contracted points when the portion of the casing disposed in the throat is rotated, said grippers having upper and lower gripping members movable into and out of engagement with the casing when the jaws are closed and opened, supporting means for the upper and lower gripping members of the grippers, said supporting means mounting said grippers for adjustment toward and from each other and including a supporting element carrying the lower gripping members of the grippers, a gage carried by said supporting element outwardly beyond one of the grippers and in spaced relation thereto, a sausage casing support separate from said supporting element and slidably adjustable thereon between said gage and gripper, means for driving the belt, and means for opening and closing the jaws.

2. A sausage linking machine including jaw members comprising a lower frame and an upper frame, said frames being hinged together by a pivot, to permit rising and lowering movements of the upper frame relative to the lower frame, a pair of longitudinally spaced horizontal rolls journaled on the lower frame, an upper pair of longitudinally spaced horizontal rolls journaled on the upper frame, a driving drum mounted to turn about the axis of the said pivot, a guide roll journaled between the drum and the rear pairs of the upper and lower rolls, a twisting belt, the outer portion of which is mounted outwardly of the upper and lower pairs of rolls and arranged to be driven by the drum and the inner portion of which is looped between the rolls of the upper and lower pairs and arranged to run on the guide roll, the looped portion of the belt providing oppositely traveling runs affording an open-sided throat between their points of engagement with the pairs of longitudinally spaced horizontal rolls through which a filled sausage casing may be moved endwise transversely of the belt, and means for operating the hinged upper frame to successively close the throat onto the casing and open the throat whereby the oppositely moving runs of the belt forming the throat will rotate the casing and maintain the casing centered with respect to the longitudinally spaced horizontal rolls of each jaw frame.

3. The structure defined in claim 2 in which the guide roll is yieldingly held to tension the belt.

4. The structure defined in claim 2 in which the guide roll is carried by supports which are pivotally mounted for bodily shifting the roll toward or from the drum, and yielding means under strain to draw the throat of the belt toward the driving drum.

5. A sausage linking machine including jaw members comprising a lower frame and an upper frame, said frames being hinged together by a pivot to permit rising and lowering movements of the upper frame relative to the lower frame, a lower pair of horizontal rolls journaled on the lower frame at spaced intervals from each other and from said pivot, an upper pair of horizontal rolls journaled on the upper frame at spaced intervals from each other and from said pivot, a driving drum mounted to turn about the axis of the said pivot, a guide roll journaled between the drum and the rear pairs of the upper and lower rolls, a twisting belt, the outer portion of which is mounted outwardly of the upper and lower pairs of horizontal rolls and arranged to be driven by the drum and the inner portion of which is looped between the rolls of the upper and lower pairs and arranged to run on the guide roll, the looped portion of the belt providing oppositely traveling runs affording an open-sided throat between their points of engagement with the horizontal rolls through which a filled sausage casing may be moved endwise transversely of the belt, a rotatable cam mounted on the lower frame, and a cooperating cam pin on the hinged frame, said cam being operable to raise and lower the hinged frame.

6. The structure defined in claim 5 which further includes co-operating pincer members mounted on the jaw frame members on each side of the throat and operable therewith to contract the casing, during the closing of the throat, to permit the twisting of the casing to form a link from the section of the casing in the throat.

7. The structure defined in claim 5 in which the guide roll is endwise removable from the belt and in which the two frames are open outwardly of the face of the belt, whereby the throat of the belt may be removed from between the upper and lower pairs of rolls and thereafter said belt removed from said upper and lower pairs of rolls and from the driving drum.

8. A sausage linking machine comprising a base, jaw members including a lower frame removably mounted on the base and an upper frame, said frames being hinged together by a pivot to permit rising and lowering movements of the upper frame relative to the lower frame, a lower pair of longitudinally spaced horizontal rolls journaled on the lower frame, an upper pair of longitudinally spaced horizontal rolls journaled on the upper frame, a driving drum journaled to turn about the axis of the said pivot, a guide roll journaled between the drum and the rear pair of upper and lower rolls, a twisting belt, the outer portion of which is mounted outwardly of the upper and lower pairs of rolls and arranged to be driven by the drum and the inner portion of which is looped between the rolls of the upper and lower pairs and arranged to run on the guide roll, the looped portion of the belt affording an open-sided throat through which a filled sausage casing may be moved endwise transversely of the belt, means for operating the hinged frame to successively close the throat onto the casing, whereby oppositely moving runs of the belt forming the throat will rotate the casing, grippers for supporting the casing on opposite sides of the throat and contracting and holding the casing at spaced points to form twists in the casing at such contracted points when the portion of the casing disposed in the throat is rotated, said grippers having upper and lower gripping members movable into and out of engagement with the casing when the jaws are closed and opened, supporting means for the grippers mounting the grippers for adjustment toward and from each other, said supporting means including a supporting element on which the lower gripping members are slidably mounted, a gage carried by the supporting element outwardly beyond one of the grippers and in spaced relation thereto, a sausage casing support separate from and disposed on the supporting element between said gage and grippers, and means for operating the belt.

9. A sausage linking machine including jaw members comprising a lower frame and an upper frame, said frames being hinged together by a pivot to permit rising and lowering movements of the upper frame relative to the lower frame, a lower pair of longitudinally spaced horizontal rolls journaled on the lower frame, an upper pair of longitudinally spaced horizontal rolls journaled on the upper frame, a driving drum mounted to turn about the axis of the said pivot, a guide roll journaled between the drum and rear pairs of the upper and lower rolls, a twisting belt, the outer portion of which is mounted outwardly of the upper and lower pairs of rolls and arranged to be driven by the drum and the inner portion of which is looped between the rolls of the upper and lower pairs and arranged to run on the guide roll, the looped portion of the belt affording an open-sided throat through which a filled sausage casing may be moved endwise transversely of the belt, means for operating the hinged upper frame to successively close the throat onto the casing and open the same whereby the oppositely moving runs of the belt forming the throat will rotate the casing and maintain the casing centered with respect to the spaced horizontal rolls of each frame, grippers for supporting the casing on opposite sides of the throat and contracting and holding the casing at spaced points to form twists in the casing at such contracted points when the portion of the casing disposed in the throat is rotated, said grippers having upper and lower members, said upper members being movable toward and from the lower members and into and out of engagement with the casing when the jaws are closed and opened, supporting means for the grippers mounting the grippers for adjustment toward and from each other, said supporting means including a supporting element on which the lower gripper members are slidably mounted, a gage carried by the supporting element outwardly beyond one of the grippers and in spaced relation thereto, a sausage casing support separate from and disposed on said supporting element between said gage and grippers, means for driving the belt, and means for opening and closing the jaws.

10. A sausage linking machine including jaw members comprising a lower frame and an upper frame, said frames being hinged together at one end by a pivot to permit rising and lowering movements of the upper frame relative to said lower frame, upper and lower pairs of longitudinally spaced horizontal rolls journaled respectively on the upper and lower frames, the rolls of each pair being spaced similarly from each other and from the hinge axis of the said pivot, a driving drum mounted to rotate about an axis coincident with the hinge axis of the said pivot, a guide roll journaled between the drum and the rear pairs of the upper and lower rolls, a twisting belt, the outer portion of which is mounted outwardly of the upper and lower pairs of rolls and arranged to be driven by the drum and the inner portion of which is looped between the rolls of the upper and lower pairs and arranged to run on the guide roll, the looped portion of the belt providing oppositely traveling runs affording an open-sided throat between their points of engagement with the pairs of longitudinally spaced horizontal rolls through which a filled sausage casing may be moved endwise transversely of the belt, and means for continuously driving said drive roll and periodically alternately raising and lowering the hinged upper frame to successively close the throat onto the casing and open the throat whereby the oppositely moving runs of the belt forming the throat will rotate the casing, and maintain the casing centered with respect to the longitudinally spaced horizontal rolls of each frame.

11. A sausage linking machine comprising a base, a lower jaw member mounted on the base, and an upper jaw member, said jaw members being hinged together by a pivot to permit rising and lowering movements of the upper jaw member relative to the lower jaw member, a driving drum journaled to turn about the axis of said pivot, a lower pair of longitudinally spaced rolls journaled on the lower jaw member in advance of the drum, an upper pair of longitudinally spaced horizontal rolls journaled on the upper jaw member in advance of the drum, the rolls of each pair of longitudinally spaced pairs of rolls being spaced substantially equidistantly from each other and from the driving drum, a twisting belt the outer portion of which is mounted outwardly of the upper and lower pairs of longitudinally spaced rolls and arranged to be driven by the drum and the inner portion of which is looped between the rolls of the upper and lower longitudinally spaced pairs and arranged to run on the guide roll, the looped portion of the belt affording an open-sided throat through which a filled sausage casing may be moved endwise transversely of the belt, and means acting on said drum for driving the belt.

12. A sausage linking machine comprising a base, a lower jaw member mounted on the base, and an upper jaw member, said jaw members being hinged together by a pivot to permit rising and lowering movements of the upper jaw member relative to the lower jaw member, a driving drum journaled to turn about the axis of said pivot, a lower pair of longitudinally spaced rolls journaled on the lower jaw member in advance of the drum, an upper pair of longitudinally spaced horizontal rolls journaled on the upper jaw member in advance of the drum, the rolls of each pair of longitudinally spaced pairs of rolls being spaced substantially equidistantly from each other and from the driving drum, a twisting belt the outer portion of which is mounted outwardly of the upper and lower pairs of longitudinally spaced rolls and arranged to be driven by the drum and the inner portion of which is looped between the rolls of the upper and lower longitudinally spaced pairs and arranged to run on the guide roll, the looped portion of the belt affording an open-sided throat through which a filled sausage casing may be moved endwise transversely of the belt, means acting on the drum for driving the belt, and automatic means for periodically moving the upper jaw downwardly and upwardly relatively to the lower jaw to bring the runs of the inner belt loop into and out of sausage casing engaging position.

ERNEST A. MUMMÉ.